US009781549B2

United States Patent
Lamba et al.

(10) Patent No.: US 9,781,549 B2
(45) Date of Patent: *Oct. 3, 2017

(54) TUNING A NFC ANTENNA OF A DEVICE

(71) Applicant: Square, Inc., San Francisco, CA (US)

(72) Inventors: Kartik Lamba, Berkeley, CA (US); Jeremy Wade, San Francisco, CA (US); Matthew H. Maibach, San Francisco, CA (US); Jesse Dorogusker, Palo Alto, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,598

(22) Filed: Apr. 8, 2016

(65) Prior Publication Data

US 2016/0342819 A1    Nov. 24, 2016

Related U.S. Application Data

(63) Continuation of application No. 14/868,261, filed on Sep. 28, 2015, now Pat. No. 9,396,368.

(Continued)

(51) Int. Cl.
*G06K 7/00* (2006.01)
*H04W 4/00* (2009.01)
(Continued)

(52) U.S. Cl.
CPC ........ *H04W 4/008* (2013.01); *G06K 7/10148* (2013.01); *G06K 7/10336* (2013.01); *G06Q 20/3278* (2013.01); *H01Q 1/2216* (2013.01); *H01Q 7/00* (2013.01); *H04B 1/401* (2013.01); *H04B 5/0031* (2013.01); *H04B 5/0075* (2013.01); *H04W 52/0225* (2013.01); *Y02B 60/50* (2013.01)

(58) Field of Classification Search
CPC .. H04B 5/0031; H04B 5/0037; H04B 5/0081; H04B 5/0012; H04B 5/0025; H04B 5/0062; H04B 5/0075; H04B 5/0087; H04B 5/02; H04B 7/0617; H04B 7/0695; G06K 19/07749; G06K 7/0008; G06K 7/10237
USPC ................................. 235/493, 492
See application file for complete search history.

(56) References Cited

U.S. PATENT DOCUMENTS 5,434,395 A    7/1995 Storck et al.
D405,070 S    2/1999 Kitagawa et al.
(Continued)

FOREIGN PATENT DOCUMENTS

| WO | 2012/003892 A1 | 1/2012 |
| WO | 2014/008310 A1 | 1/2014 |
| WO | 2016/191299 A2 | 12/2016 |

OTHER PUBLICATIONS

English-language translation of Office Action for Japanese Design Application No. 2015-026521, mailed on Mar. 15, 2016.
(Continued)

*Primary Examiner* — Thien M Le
(74) *Attorney, Agent, or Firm* — Polsinelli PC

(57) ABSTRACT

A NFC object reader's NFC antenna system configured to dynamically change an element of the NFC antenna system to maintain the NFC antenna system's antenna default resonant frequency. The NFC antenna system can be configured to include a tuning subsystem, integrated with sensors to trigger tuning of NFC antenna system's antenna.

20 Claims, 11 Drawing Sheets

Related U.S. Application Data

(60) Provisional application No. 62/165,921, filed on May 23, 2015, provisional application No. 62/171,175, filed on Jun. 4, 2015.

(51) Int. Cl.
| | |
|---|---|
| G06K 7/10 | (2006.01) |
| H04B 5/00 | (2006.01) |
| G06Q 20/32 | (2012.01) |
| H04B 1/401 | (2015.01) |
| H04W 52/02 | (2009.01) |
| H01Q 1/22 | (2006.01) |
| H01Q 7/00 | (2006.01) |

(56) References Cited

U.S. PATENT DOCUMENTS

| | | | |
|---|---|---|---|
| D411,524 S | 6/1999 | Kitagawa et al. | |
| D495,700 S | 9/2004 | Mukai et al. | |
| D500,039 S | 12/2004 | Chen | |
| D653,664 S | 2/2012 | Turnbull et al. | |
| D675,173 S | 1/2013 | Paradise et al. | |
| D676,047 S | 2/2013 | White et al. | |
| D680,537 S | 4/2013 | Miller et al. | |
| D681,639 S | 5/2013 | Cruz et al. | |
| D688,241 S | 8/2013 | Miller et al. | |
| D696,255 S | 12/2013 | Bousfield et al. | |
| D705,201 S | 5/2014 | Isaacs et al. | |
| D711,876 S | 8/2014 | McWilliam et al. | |
| 8,818,867 B2 | 8/2014 | Baldwin et al. | |
| D716,304 S | 10/2014 | Orthey | |
| D719,561 S | 12/2014 | Akana et al. | |
| 9,058,172 B2 | 6/2015 | Babu et al. | |
| 9,063,737 B2 | 6/2015 | Babu et al. | |
| D736,207 S | 8/2015 | Bousfield et al. | |
| D740,285 S | 10/2015 | Templeton | |
| D740,286 S | 10/2015 | Templeton | |
| D740,819 S | 10/2015 | Weber et al. | |
| 9,396,368 B1 * | 7/2016 | Lamba | G06K 7/10148 |
| D766,238 S | 9/2016 | Nguyen | |
| D766,901 S | 9/2016 | Nguyen | |
| 9,438,300 B1 * | 9/2016 | Oliaei | H04B 1/40 |
| D774,510 S | 12/2016 | Rotsaert | |
| D776,658 S | 1/2017 | Zhu et al. | |
| D780,731 S | 3/2017 | Kim et al. | |
| 2006/0109123 A1 | 5/2006 | Carrender | |
| 2006/0142058 A1 | 6/2006 | Elias et al. | |
| 2006/0157565 A1 | 7/2006 | Shiomi | |
| 2006/0219776 A1 | 10/2006 | Finn | |
| 2007/0090927 A1 | 4/2007 | Potyrailo et al. | |
| 2010/0308976 A1 | 12/2010 | Seban et al. | |
| 2011/0070834 A1 | 3/2011 | Griffin et al. | |
| 2012/0126011 A1 | 5/2012 | Lamba et al. | |
| 2013/0035051 A1 | 2/2013 | Mujtaba et al. | |
| 2013/0040560 A1 | 2/2013 | Kennedy et al. | |
| 2013/0248601 A1 | 9/2013 | Liang et al. | |
| 2013/0314214 A1 | 11/2013 | Leica et al. | |
| 2014/0127995 A1 | 5/2014 | Hendricksen et al. | |
| 2014/0187153 A1 | 7/2014 | Zhu et al. | |
| 2014/0328488 A1 | 11/2014 | Caballero et al. | |
| 2015/0118956 A1 * | 4/2015 | Desai | H04B 5/0037 455/41.1 |
| 2015/0242663 A1 | 8/2015 | Babu et al. | |
| 2015/0249485 A1 * | 9/2015 | Ouyang | H04B 5/0081 455/41.1 |
| 2015/0341073 A1 * | 11/2015 | Ayala Vazquez | H04B 1/40 455/77 |
| 2015/0355251 A1 * | 12/2015 | Pascolini | G01R 29/10 343/703 |
| 2016/0026831 A1 | 1/2016 | Babu et al. | |
| 2016/0126619 A1 * | 5/2016 | Tenbroek | H03H 7/40 343/745 |
| 2016/0345123 A1 | 11/2016 | Lamba et al. | |
| 2017/0046677 A1 | 2/2017 | Babu et al. | |

OTHER PUBLICATIONS

English-language translation of Office Action for Japanese Design Application No. 2015-026523, mailed on Mar. 15, 2016.
Notice of Allowance mailed May 17, 2016, for Design U.S. Appl. No. 29/528,683, of Nguyen, A., filed May 29, 2015.
Notice of Allowance mailed May 17, 2016, for Design U.S. Appl. No. 29/532,633, of Nguyen, A.P., filed Jul. 8, 2015.
Certificate of Registration for Canadian Design Registration No. 165620, mailed on Jun. 23, 2016.
Certificate of Registration for Canadian Design Registration No. 165621, mailed on Jun. 23, 2016.
Notice of Allowance mailed Jun. 29, 2016, for Design U.S. Appl. No. 29/528,683, of Nguyen, A., filed May 29, 2015.
English-language translation of Decision of Registration (Allowance) for Japanese Design Patent Application No. 2015-026521, mailed Jul. 5, 2016.
English-language translation of Decision of Registration (Allowance) for Japanese Design Patent Application No. 2015-026523, mailed Jul. 5, 2016.
Notice of Allowance mailed Jul. 13, 2016, for Design U.S. Appl. No. 29/532,633, of Nguyen, K, filed Jul. 8, 2015.
Notice of Allowance mailed Jul. 28, 2016, for U.S. Appl. No. 14/709,375, of Babu, A., et al., filed May 11, 2015.
Certificate of Design Registration for Japanese Design Patent Application No. 2015-026523, mailed Aug. 12, 2016 (Registration No. 1558509).
Certificate of Design Registration for Indian Design Patent Application No. 277744, mailed Aug. 23, 2016.
Certificate of Design Registration for Indian Design Patent Application No. 277745, mailed Sep. 26, 2016.
Non-Final Office Action mailed Oct. 25, 2016, for U.S. Appl. No. 14/868,247, of Lamba, K., et al., filed Sep. 28, 2015.
Non-Final Office Action mailed May 8, 2014, for U.S. Appl. No. 13/603,941, of Babu, A., et al., filed Sep. 5, 2012.
Non-Final Office Action mailed May 12, 2014, for U.S. Appl. No. 13/603,992, of Babu, A., et al., filed Sep. 5, 2012.
Notice of Allowance mailed Feb. 9, 2015, for U.S. Appl. No. 13/603,992, of Babu, A., et al., filed Sep. 5, 2012.
Notice of Allowance mailed Feb. 17, 2015, for U.S. Appl. No. 13/603,941, of Babu, A., et al., filed Sep. 5, 2012.
Non-Final Office Action mailed Jul. 9, 2015, for U.S. Appl. No. 14/709,375, of Babu, A., et al., filed May 11, 2015.
Non-Final Office Action mailed Nov. 25, 2015, for U.S. Appl. No. 14/868,261, of Lamba, K, et al., filed Sep. 28, 2015.
Examination Report mailed Dec. 1, 2015, for European Design Registration Nos. 302873877-0001/002873877-0002, filed on Nov. 23, 2015.
Non-Final Office Action mailed Jan. 21, 2016, for U.S. Appl. No. 14/709,375, of Babu, A., et al., filed May 11, 2015.
First Examination Report for Indian Design Application No. 277744, mailed on Mar. 8, 2016.
Notice of Allowance mailed Mar. 9, 2016, for U.S. Appl. No. 14/874,301, of Babu, A., et al., filed Oct. 2, 2015.
First Examination Report for Indian Design Application No. 277745, mailed on Mar. 11, 2016.
Notice of Allowance mailed Mar. 18, 2016, for U.S. Appl. No. 14/868,261, of Lamba, K, et al., filed Sep. 28, 2015.
International Search Report and Written Opinion for International Application No. PCT/US2013/049162, mailed on Oct. 16, 2013.
Certificate of Registration for European Design Registration No. 002873877-0001, mailed on Nov. 23, 2015.
Certificate of Registration for European Design Registration No. 002873877-0002, mailed on Nov. 23, 2015.
Certificate of Design Registration for Australian Design Registration No. 365814, dated Dec. 15, 2015.
Certificate of Design Registration for Australian Design Registration No. 365812, dated Dec. 15, 2015.
Certificate of Design Registration for Japanese Design Patent Application No. 2015-026521, mailed Aug. 12, 2016 (Registration No. 1558508).
Office Action for European Patent Application No. 13 740 420.8, mailed Feb. 7, 2017.

(56) References Cited

OTHER PUBLICATIONS

Final Office Action mailed Mar. 21, 2017, for U.S. Appl. No. 14/868,247, of Lamba, K., et al., filed Sep. 28, 2015.
Gebhart, M., et al., "Automated Antenna Impedance Adjustment for Near Field Communication (NFC)," 12th International Conference on Telecommunications (ConTEL), pp. 235-242 (Jun. 26-28, 2013).
International Search Report and Written Opinion for International Patent Application No. PCT/US2016/033601, mailed Nov. 22, 2016.
Notice of Allowance dated May 12, 2017, for U.S. Appl. No. 29/575,535, of Nguyen, A.P., filed Jul. 25, 2016.
Non-Final Office Action dated May 19, 2017, for U.S. Appl. No. 15/336,597, of Babu, A., et al., filed Oct. 27, 2016.
Advisory Action dated May 26, 2017, for U.S. Appl. No. 14/868,247, of Lamba, K., et al., filed Sep. 28, 2015.

* cited by examiner

TUNING A NFC ANTENNA OF A DEVICE

CROSS-REFERENCE TO RELATED APPLICATIONS

This application is a continuation of U.S. application Ser. No. 14/868,261, filed Sep. 28, 2015, entitled, "TUNING A NFC ANTENNA OF A DEVICE," which is a non-provisional conversion of, and claims priority to, U.S. Provisional Application No. 62/165,921, filed May 23, 2015, entitled "PAYMENT TERMINAL WITH ACCELEROMETER (SQ-475)—AND—TUNING NFC ANTENNAE BASED ON PROXIMITY OF AN NFC ENABLED OBJECT TO THE ANTENNA (SQ-469)," and U.S. Provisional Application No. 62/171,175, filed Jun. 4, 2015, entitled "TUNING NFC ANTENNA BASED ON POWER LEVEL OF A POWER SYSTEM OF THE NFC ANTENNA"; all of which are hereby incorporated by reference herein in their entireties.

BACKGROUND

An introduction of an object into an electromagnetic field can change the tuning of an antenna's field. The antenna's field can be detuned or degraded by having a frequency of the antenna's drift away from the resonant frequency of the antenna. For example, within a certain distance threshold, a NFC enabled object can degrade the tuning of a NFC antenna as the object gets closer to the antenna. The most extreme such cases is the zero centimeter case—wherein the NFC enabled object is zero centimeters or adjacent to the NFC antenna, and the NFC antenna detunes the most.

The detuning of an antenna can have adverse effects to the antenna's function. For example, in the zero centimeter case described above, the NFC antenna requires greater power to read the NFC enabled object.

Detuning of an antenna is exacerbated by smaller antennas, as are commonly found in mobile payment devices.

BRIEF DESCRIPTION OF THE DRAWINGS

In order to describe features of the disclosure, a more particular description of the presently described technology will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

System, devices, methods, and non-transitory computer-readable media disclosed in accordance with various embodiments of the present disclosure overcome one or more deficiencies in conventional approaches to point of sale systems. In particular, in accordance with various embodiments, approaches provide for tuning a payment object reader that is used in performing a payment transaction at a point-of-sale system.

Other advantages, variations, and functions are described and suggested below as can be provided in accordance with the various embodiments.

The present disclosure is for dynamically tuning a NFC antenna by a NFC antenna system in a NFC object reader. Generally, the NFC antenna generates a default frequency range. The presence of an object with electromagnetic properties can detune the NFC antenna away from its default frequency range. For example, a NFC enabled object, like a NFC enabled card, when close enough to the NFC antenna, can detune the NFC antenna making the NFC enabled object difficult to read.

As used herein, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

Figure 1:
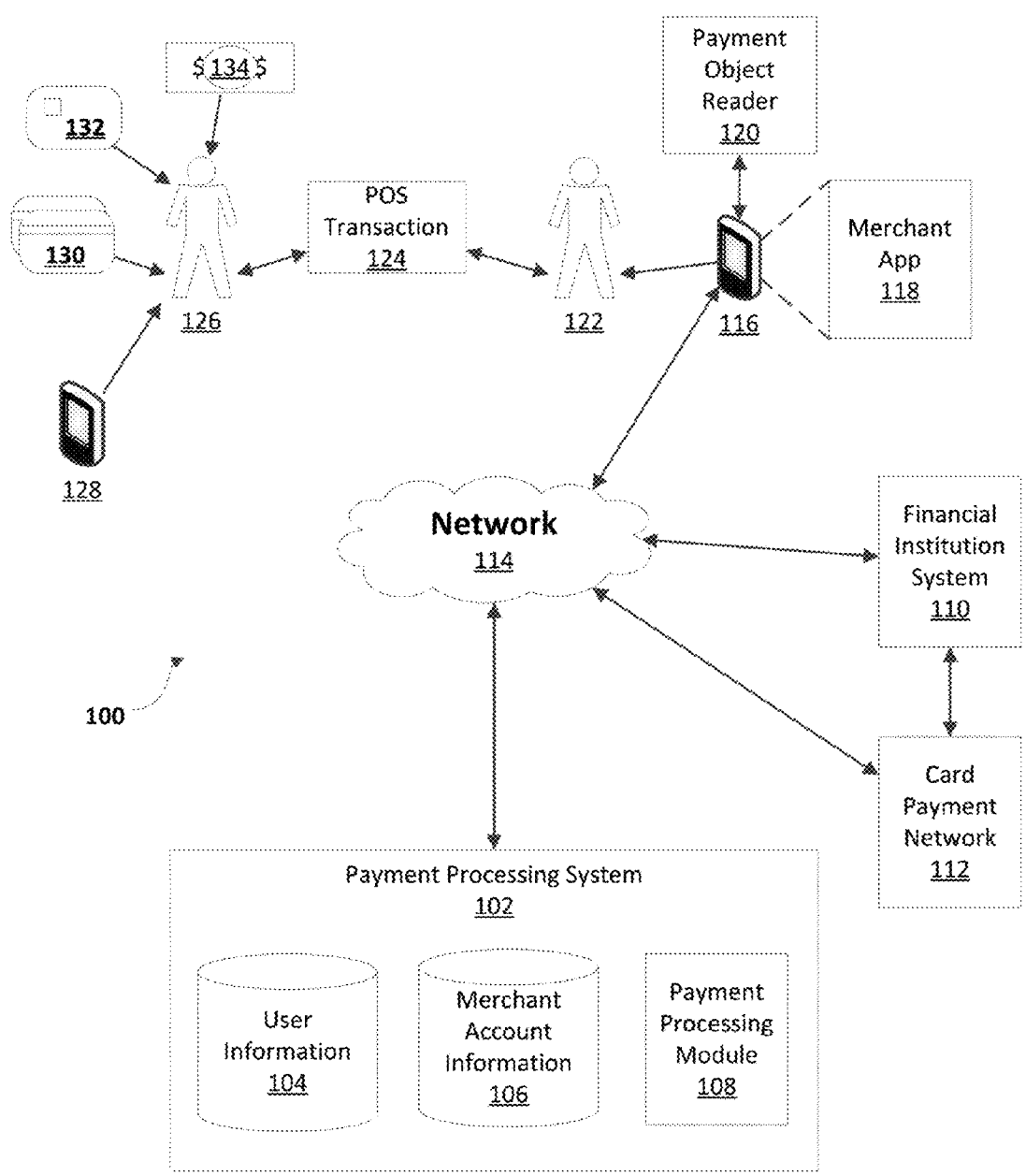
FIG. 1 illustrates an example payment communication system for enabling transactions between merchants and buyers.

FIG. 1 illustrates an example architecture of a payment communication system 100 for enabling point-of-sale (POS) transactions between merchants 122 and buyers 126. In the example of FIG. 1, a buyer 126 can use any of a variety of payment objects, such as payment cards 130, 132 or cash 134 when participating in a POS transaction 124 with a merchant 122. A buyer 126 can typically have payment cards 130, 132 such as credit cards, debit cards, prepaid cards, and the like, that the buyer 126 can use for conducting a POS transaction 124. In some embodiments, the payment cards 130 can include one or more magnetic stripes for providing payment object and buyer information when swiped in a payment object reader 120 communicatively coupled to a merchant device 116. In some embodiments, other types of payment objects can be used, for example smart cards 132 having a built in integrated circuit including a memory chip (e.g., EMV payment objects), a radio frequency identification tag (e.g., near field communication enabled objects), and the like. In some embodiments, the user 126 can use the user device 128 to conduct NFC payment transactions through communication between the user device 128 and the payment object reader/transmitter device 120.

The payment communication system 100 in the example of FIG. 1 illustrates a merchant device 116 associated with the merchant 122 that participates in the payment service provided by the service provider of the payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, etc.

The merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. The payment object reader can read data from a magnetic stripe card or an EMV chip-type card and communicate the data to the merchant device 116. The payment object reader can also read data from a NFC device and communicate the data to the merchant device 116.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, the payment processing system 102 is configured to send and receive data to and from the user device and the merchant device. For example, the payment system can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, the payment system can also be configured to communicate with a computer system of a card payment network 112, e.g., MasterCard®, VISA®, etc., over the network, or over a different network, for example, to conduct electronic financial transactions. The computer system of the card payment network can communicate with a computer system of a financial institution system 110, e.g., a bank. There can be computer systems of other entities, e.g., the card acquirer, between the payment system and the computer system of the card issuer.

The payment system can then communicate with the computer system of a card payment network 112 to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

The transaction information can include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer can sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), data describing a buyer, any type of data that is received upon a buyer's authentication into a social network, if any, and various other types of information.

To accept electronic payments using the POS system 100, the merchant 122 typically creates a merchant account with the payment processing system 102 by providing information describing the merchant including, for example, merchant name, contact information (e.g., telephone numbers, the merchant's address, and one or more financial accounts to which funds collected from buyers will be deposited). This merchant information can be securely stored by the payment processing system, for example, as merchant account information 106 in a secure database. Further, the merchant information can include a merchant profile created for each merchant. The merchant profile can include information about the merchant 122 and transaction information associated with transactions conducted by the merchant.

The payment processing system 102 provides a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, card payment networks 112, and bank or other financial institution payment systems 110. The payment processing system 102 includes a payment processing module 108 that receives transaction information for processing payments made through the merchant application 118. For example, the payment processing module 108 can receive transaction information, such as an amount of the transaction, and can verify that a particular payment card 130, 132 can be used to pay for the transaction, such as by contacting a card clearinghouse of a card payment network 112. Furthermore, in some examples, the payment processing module 108 can redirect payment information for transactions to be made using payment cards 130, 132 to a bank, or other financial institution, payment system 110. In other embodiments, the merchant device 116 can communicate directly with an appropriate card payment network 112 or bank payment system 110 for approving or denying a transaction using a particular payment card 130, 132 for a POS transaction 124.

As introduced above, the payment processing system 102 can be configured to communicate with one or more systems of a card payment network 112 (e.g., MasterCard®, VISA®, etc) over the network 114 to conduct financial transactions electronically. The payment processing system 102 can also communicate with one or more bank payment systems 110 of one or more banks over the network 114. For example, the payment processing system 102 can communicate with an acquiring bank, a payment card issuing bank, and/or a bank maintaining buyer accounts for electronic payments.

A payment card acquiring bank can be a registered member of a card association (e.g., Visa®, MasterCard®, etc), and can be part of a card payment network 112. A payment card issuing bank can issue payment cards 130, 132 to buyers 126, and can pay acquiring banks for purchases made by cardholders to which the issuing bank has issued a payment card 130, 132. Accordingly, in some embodiments, the systems of an acquiring bank can be included in the card payment network 112 and can communicate with systems of a payment card issuing bank to obtain payment. Further, in some embodiments, bank payment systems 110 can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures, and thus, the foregoing are merely several examples.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some embodiments, the network 114 can be a peer-to-peer network. The network 114 can also be coupled with or include portions of a telecommunications network for sending data using a variety of different communication protocols. In some embodiments, the network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more than one network 114 can connect these entities. The payment system, the merchant device, and the user device can communicate over the network using wired or wireless connections, or combinations thereof.

In some embodiments, the payment system is configured to accept card-less payment transactions from customers, i.e., the customer 126. As used herein, a card-less payment transaction is a transaction conducted between the customer and a merchant at the point-of-sale during which a financial account of the customer is charged without the customer having to physically present a financial payment card to the merchant at the point-of-sale. In some forms of card-less payment transaction, the merchant receives at the point-of-sale details of the financial account via the mobile device 128 presenting payment information to the merchant 122 by communicating with the payment object reader 120, e.g. NFC transactions. In other forms of card-less payment transactions, the merchant need not receive any details about the financial account at the point-of-sale, e.g., the credit card issuer or credit card number, for the transaction to be processed. Instead, such details can be stored at the payment processing system 102 and provided to the merchant 122. Such card-less payment transactions can be referred to generally as card-on-file transactions. Generally, when a customer and a merchant enter into an electronic financial transaction, the transaction is processed by transferring funds from a financial account associated with the user account to a financial account associated with the merchant account.

Before conducting card-less payment transactions of the type that does not require that the merchant POS receive financial account details from customer 126, e.g., card-on-file transactions, the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

As used herein, the term "payment card," "payment object," or "payment instrument" refers to a payment mechanism which includes a debit card, a conventional credit card, "smartcards" that have embedded circuits, such integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

Figure 2:
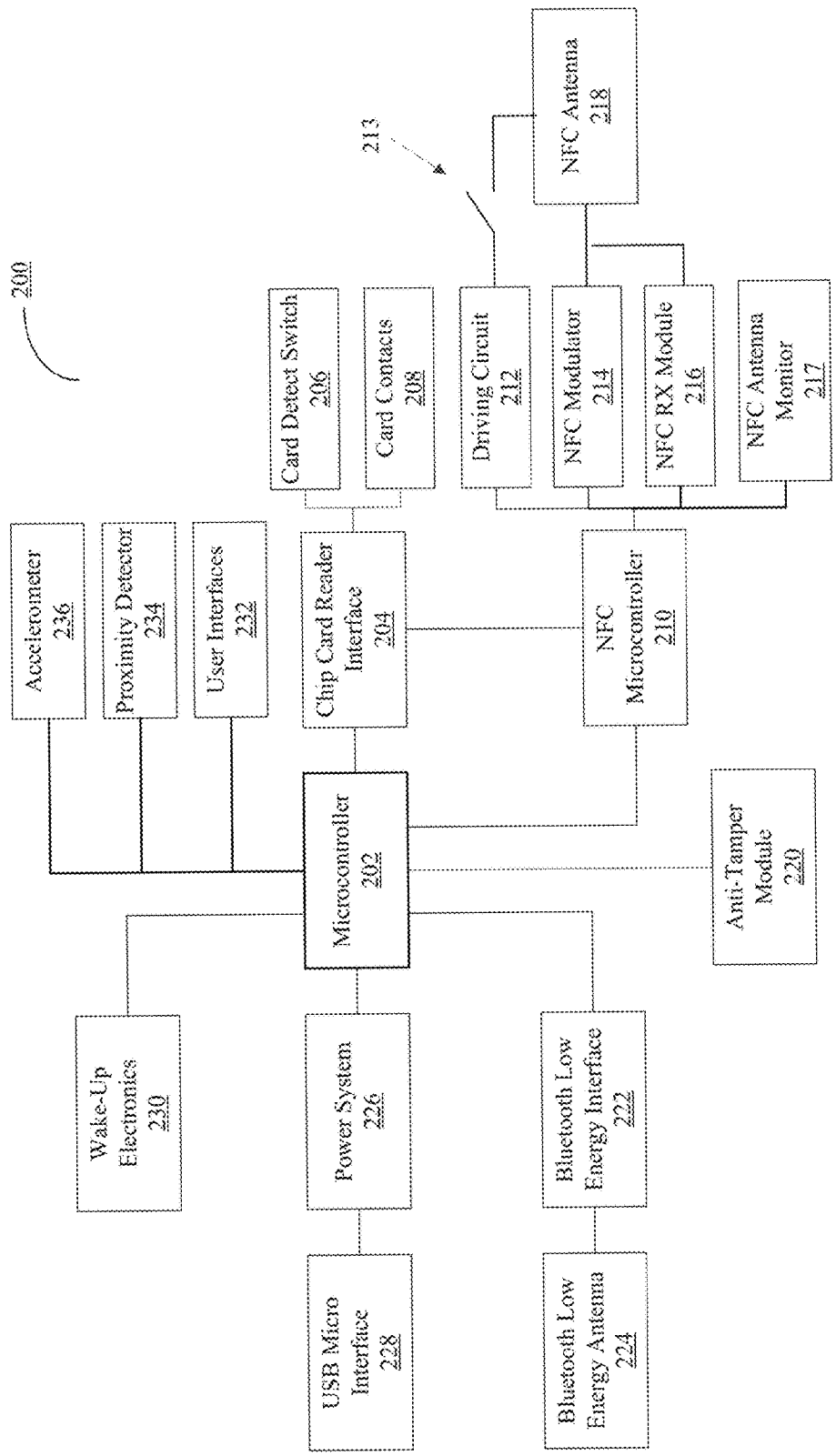
FIG. 2 illustrates an example schematic block diagram of the components of the payment object reader device.

FIG. 2 illustrates a payment object reader/transmitter device 200 in accordance with at least some embodiments of the present invention. Payment device 200 includes microcontroller 202 configured to manage functions between various components within the device. Coupled to microcontroller 202 is chip card reader interface 204, which in turn is connected to card detect switch 206 and card contacts 208. Card contacts 208 are configured to provide electrical connectivity between the contact pads of an integrated circuit enabled payment object and chip card interface 204. Furthermore, card detect switch 206 is configured to indicate when an integrated circuit payment object is inserted into payment device 200. Card detect switch 206 may be any suitable switch, electrical, mechanical, or otherwise, and in some embodiments may be integrated with card contacts 208. In situations where card detect switch 206 indicates that an integrated circuit payment object has been inserted into payment device 200, chip card reader interface 204 may be configured to read data from the integrated circuit payment object via card contacts 208.

Payment device 200 may also include a near field communication (NFC) microcontroller 210. NFC microcontroller 210 is configured to manage the transmission and reception of near field communications through control of driving circuit 212, NFC modulator 214, NFC RX module 216, NFC antenna monitoring circuit 217, and NFC antenna 218. In some embodiments, driving circuit 212 may include an H-bridge, an amplifier, a filter and/or a matching circuit. Furthermore, in some embodiments the NFC RX module 216 may include an op-amp, a filtering and conditioning circuit and/or a rectifier, such as a full wave bridge rectifier. Additionally, NFC modulator 214 may be, for example, a type-B modulator. In instances where it is desired to read a NFC enabled payment object, or a NFC enabled payment object is determined to be in proximity to payment device 200, NFC microcontroller 210 may be configured to drive NFC antenna 218 via driving circuit 212 to induce a magnetic field capable of being modulated by the NFC enabled payment object. From here, the modulated magnetic field signal may be converted into a digital signal that NFC microcontroller 210 can interpret via NFC RX module 216. On the other hand, when it is desired to transmit data via NFC antenna 218, NFC microcontroller 210 may be configured to disable driving circuit 212 and transmit data using the NFC protocol by instructing NFC modulator 214 to modulate the magnetic field to which NFC antenna 218 is operatively coupled. In some embodiments the NFC antenna 218 can drift or deviate from a desired frequency (become detuned). This can be the result of a metal object being in the proximity of device 200. The NFC antenna monitor can monitor the frequency of the antenna, and determine when the frequency of the antenna has drifted away from the desired frequency. When it is determined that the NFC antenna is out of tune, and the tuning algorithm determines that the frequency is outside of a tolerance for deviation of the frequency away from a desired frequency, NFC antenna monitor circuit 217 can work in concert with the NFC microcontroller to vary one or parameters such as capacitance, voltage, or impedance of the NFC antenna 218 to tune the NFC antenna 218. The tolerance for a deviation away from the desired frequency of an NFC antenna can be set by the microcontroller of the device so that the frequency of the NFC antenna cannot deviate more than the tolerance for deviation with respect to the desired frequency.

To supply power to the components within payment device 200, power system 226 is provided. In some embodiments, power system 226 may include a battery. Coupled to power system 226 is USB micro interface 228 configured to receive a USB micro jack, although other types of connectors may be utilized. In certain embodiments, connection of a jack to USB micro interface 228 can activate a switch within power system 226 to override power supplied by the battery. This allows for battery power to be conserved for situations where external power cannot be provided. Furthermore, power system 226 may also include a battery charger to allow the battery to be charged when external power is supplied via USB micro interface 228. Payment device 200 also includes wake-up electronics 230 configured to wake-up the device from a low-power state to an active state in response to detection of a payment object. In some embodiments, wake-up electronics 230 can also power down payment device 230 to a low-power state after a predetermined amount of time or after completion of a communication.

In some embodiments the power levels of the power system 226 can trigger degrading or other tuning the power supplied to NFC antenna 218 to conserve power. For example, when the battery level of the power system 226 falls below a threshold level, this can trigger the device to enter a power conservation mode where the microcontroller decreases the strength of the field generated by the NFC antenna 218. The reader is still able to operate, but by generating a lesser-quality field, less power is consumed, and the overall life of the battery can be prolonged.

As shown in FIG. 2, power system 226 is operatively coupled to microcontroller 202. In some embodiments microcontroller 202 can detect the level of power of the power system 226. Based on the power levels of power system 226, microcontroller 202 can trigger a decrease in the power supplied to NFC antenna 218, thereby decreasing the strength of the field generated by the NFC antenna. In some embodiments, the strength of the field generated by the NFC antenna can be accomplished using variable capacitors or other capacitive elements to retune the strength of the field without changing the amount of power supplied to the NFC antenna 218. At low power levels, when the power level of the power source is below a predetermined power level threshold, the tuning of the NFC antenna is adjusted to a first mode where a reduced (for example, 80%) amount of power is supplied to the NFC antenna. In the first mode, the microcontroller 202 can trigger the power supplied to the NFC antenna 218 to be reduced, to thereby generate a weaker field from the NFC antenna 218. When the field that is generated by the NFC antenna 218 is weakened to account for low power levels of the power system 226 of the NFC antenna 218, the payment objects may need to be closer to the reader for an accurate reading, or may need to be placed on or proximate to the reader for slightly longer periods of time while still functioning properly. At high power levels, when the power level of the power source meets or exceeds the predetermined power level, the tuning of the NFC antenna is adjusted to a second mode where an increased or a full amount of power can be supplied to the NFC antenna. In the second mode, the microcontroller 202 can supply a full strength of power to the NFC antenna 218 to generate a full strength field. The predetermined power level is an amount of power remaining in the power source, such as a percentage of battery life that remains. Accordingly, when the percentage falls below a threshold (for example the threshold can be 10 percent of battery life for a battery), the device enters the first low power mode, and when the percentage is above the threshold, the device operates in the second full power mode with the amount of power applied to the NFC antenna increased to a greater amount of power than in the first mode.

In some embodiments, a predetermined power level threshold can be set in determining whether microcontroller 202 triggers degrading the power supplied to the NFC antenna 218. For example, microcontroller 202 can detect whether the power levels of power system 226 are below the predetermined power level threshold. At power levels below the predetermined power level, microcontroller 202 can trigger degrading the power to NFC antenna 218. At power levels at least equal to the predetermined power level, microcontroller 202 can trigger full strength power to NFC antenna 218.

In some embodiments the power levels of power system 226's can go from a low power level back to a high power level. Accordingly, at the detected low power level, microcontroller 202 is operating at a low power to the NFC antenna 218. However, when the power level is detected as high, or above the predetermined power level, microcontroller 202 can trigger increasing the power to NFC antenna 218 to return to full strength.

The payment device 200 illustrated in FIG. 2 further contains a Bluetooth low energy (BLE) interface 222 and a BLE antenna 224 to enable Bluetooth communications. In addition, payment device 200 includes anti-tamper module 220 configured to prevent unauthorized tampering with the device and possible theft or interception of payment information. In certain embodiments, anti-tamper module may include a wire mesh enclosed within payment device 200.

Payment device 200 also includes user interfaces 232 to enhance the user experience. User interfaces 232 can include, but are not limited to, LED indicators, buttons and speakers. In some embodiments, speakers and LED indicators can be used to present audio and visual identifiers of transaction and device status. In addition, buttons may be configured to power payment device 200 on or off, operate the device or reset the device.

Figure 3:
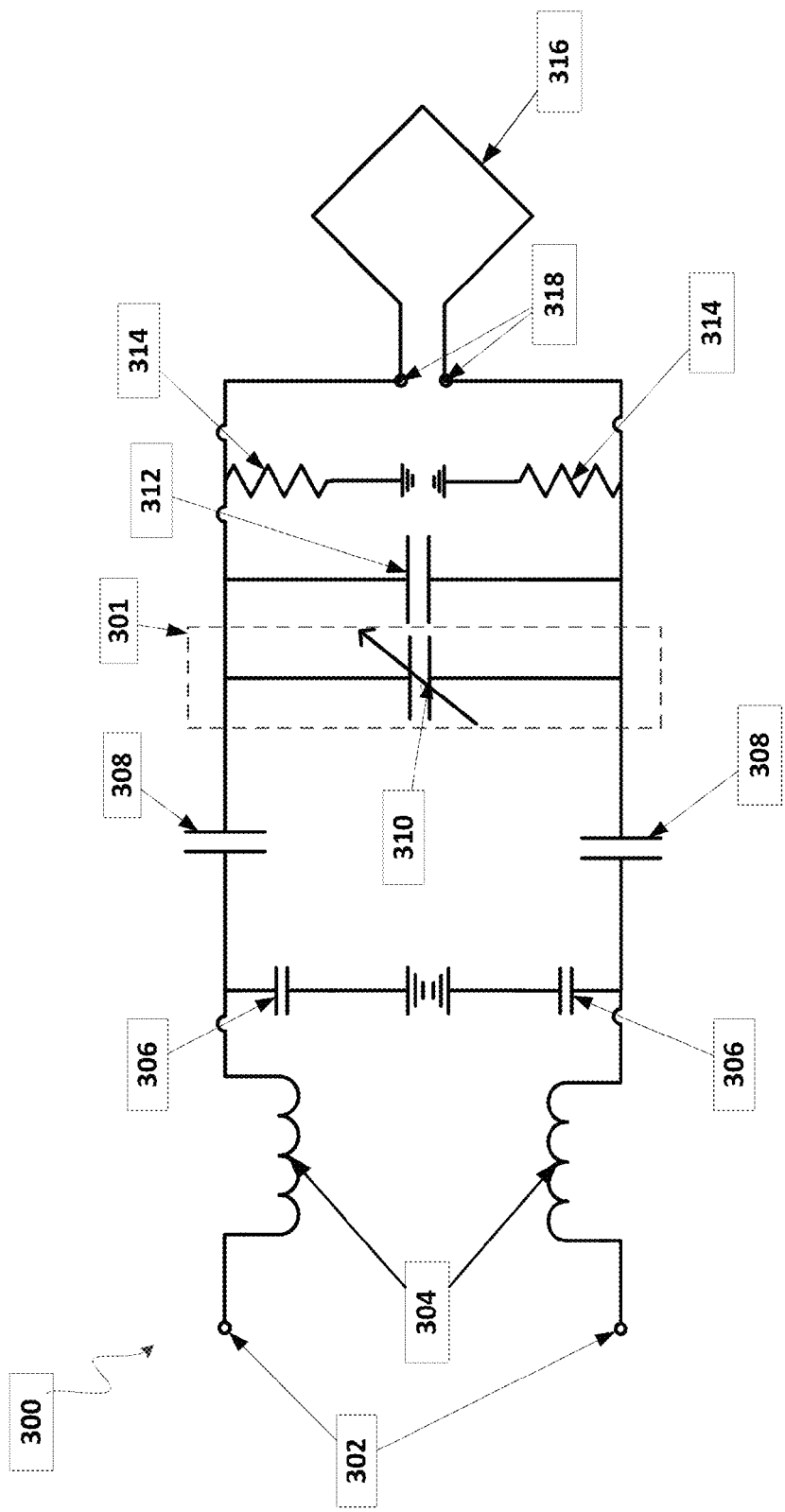
FIG. 3 illustrates an example circuit diagram for a component of the NFC payment object reader.

In some embodiments, the NFC antenna 214 can be connected to a tuning circuit. The tuning circuit is shown in FIG. 3, which illustrates a NFC antenna, tuning circuit, and driving circuit. As seen in FIG. 3, circuit 300 includes inductors 304 and capacitors 308, variable capacitor 310 and bulk capacitor 312 to maintain the default resonant frequency of antenna 316. Tuning circuit 301 includes variable capacitor 310. Capacitors 306 filter the signal and resistors 314 are bias resistors. Nodes 302 can operatively coupled to NFC microcontroller 210 or a system microcontroller 202 to control the resonant frequency of antenna 316. In some embodiments, tuning circuit 301 can tune antenna 316 by changing the capacitance of variable capacitor 310 and compensate for the detuned antenna 316. In some embodiments, the variable capacitor 310 can be a separate circuit configured to add or remove capacitance to the overall tuning circuit. For instance, an example circuit configured to add or remove capacitance to the overall tuning circuit can be a system of FET switches and a bank of discrete capacitors. Therefore, when the monitor circuit 217 determines that the NFC antenna is detuned, it can trigger controller 210 to cause the system of FET switches to switch in (or out) a bank of capacitors to add (or remove) capacitance to the NFC antenna system.

For example, monitor circuit 217 can be configured be an inductance measuring circuit to detect a change in the inductance of antenna 218. Monitor circuit 217 can also be configured to monitor the frequency of antenna 218. In some embodiments, monitor circuit 217 can be configured to be a rectifier operatively coupled to antenna 218 and a voltage comparator. A rectifier is a component that converts AC voltage to DC voltage, whereas a voltage comparator compares two voltages. The voltage comparator can be configured to determine when the rectified frequency from antenna 218 is below the DC equivalent of the AC default resonant frequency. In some embodiments, monitor circuit 217 can be configured to be an analog to digital converter (ADC) connected to antenna 218 and a microprocessor configured monitor the frequency of antenna 218.

FIG. 2 also illustrates example sensors useful in informing device 200 about its current environment, use, or state. Accelerometer 236 can be used to detect motion of the device 236. In some embodiments, detected motion (acceleration), or lack of detected motion can be interpreted by microcontroller 202 to conclude that device 200 is stationary; was stationary and is now in motion, which may indicate it is being moved toward a customer; was in motion and now is stationary, which may indicate that the device is now in a new environment, and the tuning of antenna should be check; or quick changes in motion might indicate the device is in a merchant's pocket, and the device can go into standby mode.

Similarly, proximity detector 234, can be used to determine that a payment object is coming within range of the antenna, which can be used to activate the chip card reader interface 204 or power up or increase power output to NFC antenna. In some embodiments, the proximity detector 234 can be useful in determining that a payment object is too close to the NFC antenna 218 and is causing the NFC antenna to be detuned.

In some embodiments, increasing the overall voltage for the driving circuit 212 can tune the detuned antenna 218.

Figure 4:
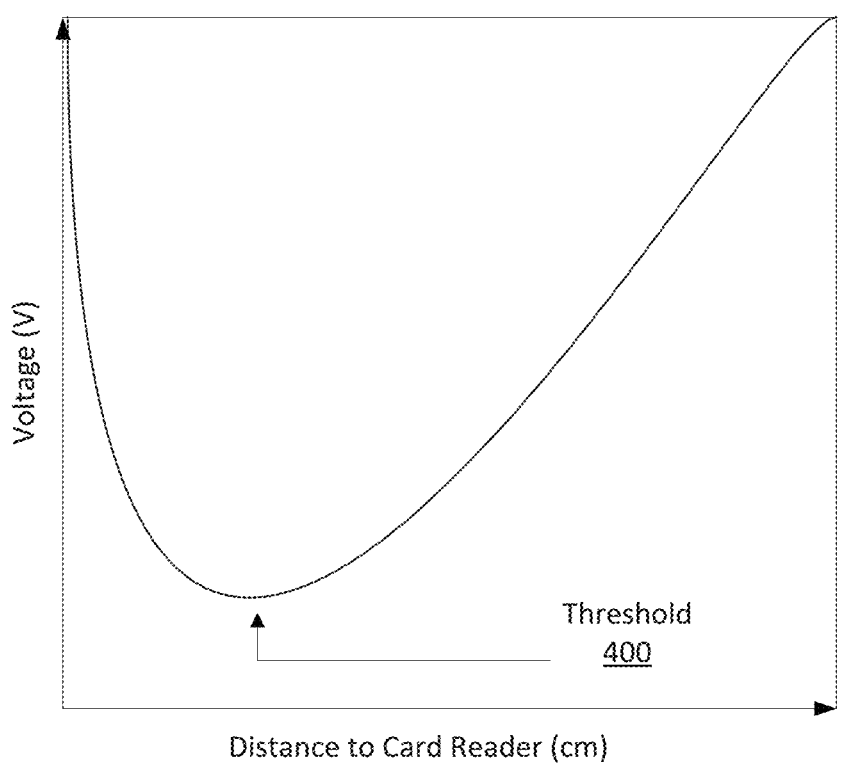
FIG. 4 illustrates the example voltage requirements for a NFC antenna system to read a NFC enabled object.

FIG. 4 illustrates the example voltage requirements for a NFC antenna system to read a NFC enabled object. As a NFC enabled object is far away, greater power requirements are required to increase the reach of the magnetic field. The power requirements decrease as the payment object gets closer to the device, until the NFC enabled payment object gets to a distance threshold 400. Once the NFC enabled payment object passes this threshold distance as it moves closer to the NFC antenna, the voltage requirements to read the NFC enabled payment object begin to increase. Additionally, the NFC enabled object begins to detune the NFC antenna as the NFC enabled object passes the distance threshold 400. In one embodiment, NFC monitor sub system 217 detects the detuned antenna 218 and triggers power system 226 to add more power to driving circuit 212 to tune detuned antenna 218. In other embodiments, detuned antenna 218 is tuned according to other techniques as described herein.

Figure 5:
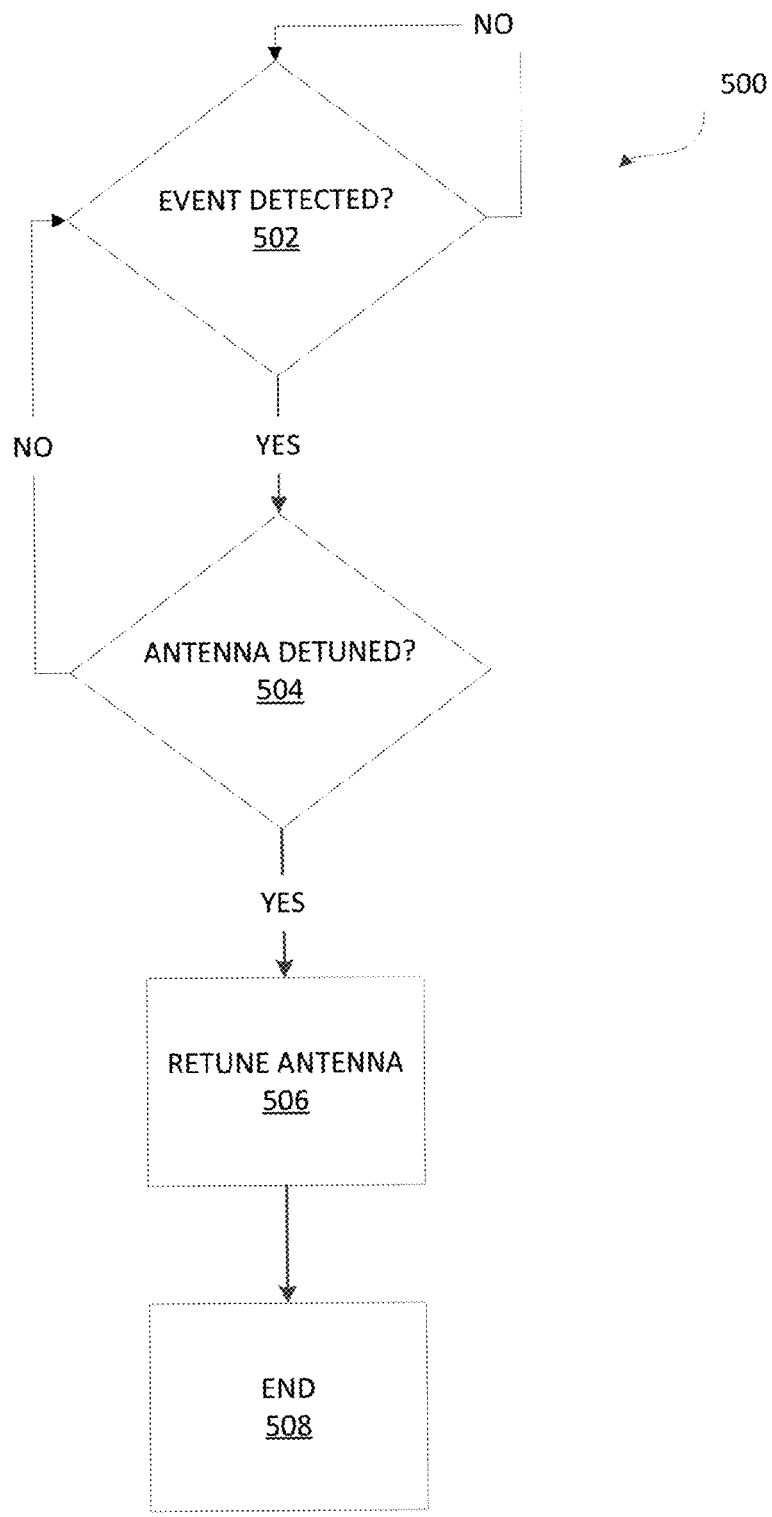
FIG. 5 illustrates an example method for tuning a NFC payment object reader.

FIG. 5 illustrates an example method for tuning a NFC payment object reader. In example method 500, at step 502 tuning is initiated upon detection of a triggering event. For example the proximity detector 234 can detect a proximate object which can trigger NFC microcontroller 210 to cause driving circuit 212 to tune NFC antenna 218. In another example, the triggering event can be an accelerometer 236 detecting motion After a triggering event 502, NFC payment object reader determines 504 whether the NFC antenna is detuned. For example in FIG. 2, NFC microcontroller 210 can be in operative communication with NFC antenna monitor 217 and can detect a detuned NFC antenna 218. Detection of a default resonant frequency produced by NFC antenna 218 (i.e., the antenna is in tune) can cause method 500 to proceed back to the event detection loop 502.

When it is determined that the NFC antenna is detuned, action is taken to tune the NFC antenna. In some embodiments the driving circuit 212 can tune the detuned NFC antenna 218 by varying the capacitance of a variable capacitor. In another example, the NFC Antenna Monitor 217 can detect a detuned NFC antenna 218 and can trigger NFC microcontroller 210 to cause driving circuit 212 to trigger FET switches to switch in one or more members of a bank of capacitors to add capacitance to driving circuit 212.

Figure 6:
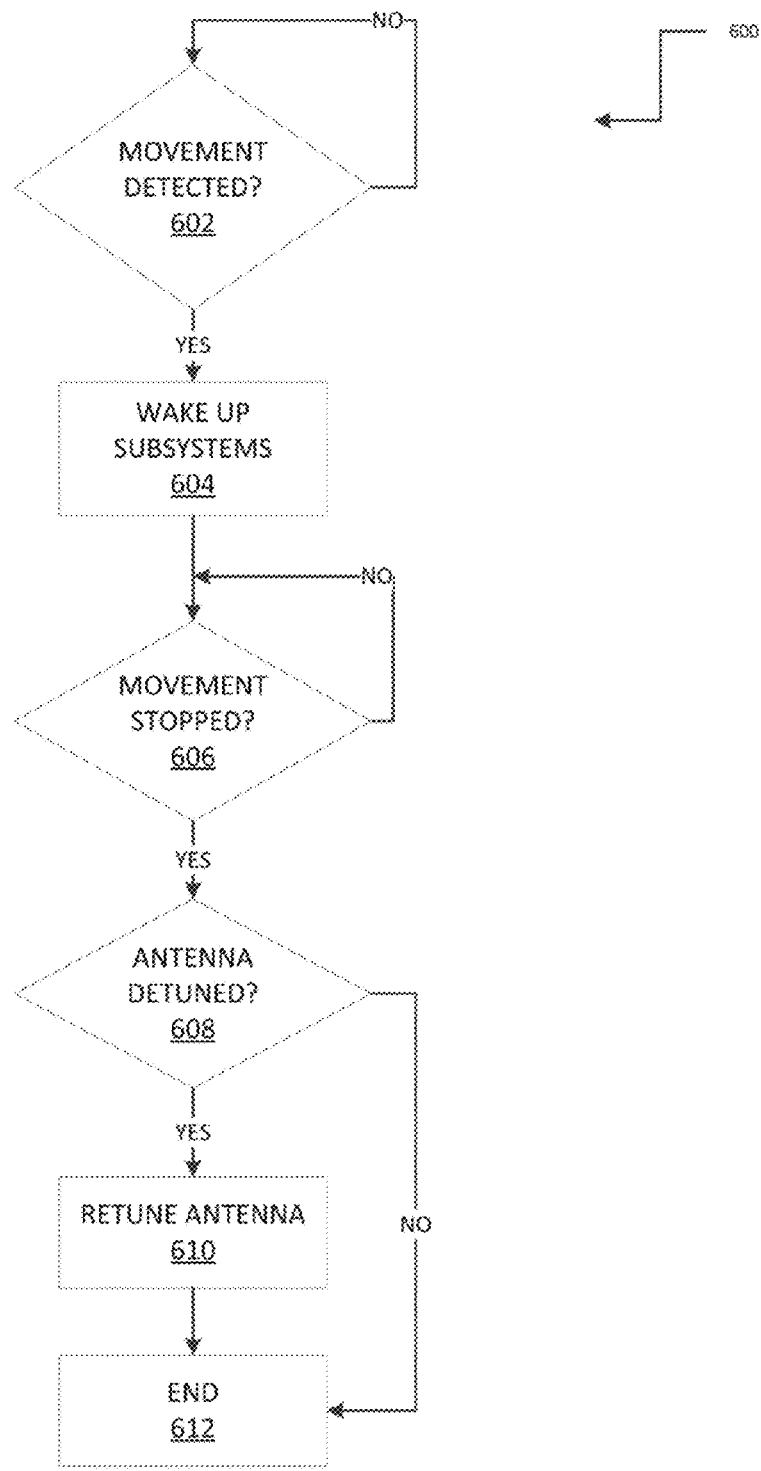
FIG. 6 illustrates an example method for tuning a NFC payment object reader in response to receiving an input from an accelerometer.

In some embodiments, the detected event can be movement. FIG. 6 illustrates an example method for tuning a NFC payment object reader in response to receiving an input from an accelerometer.

At step 602 the NFC payment object reader detects whether there is movement. For example, in FIG. 2, accelerometer 236 can detect movement. If the accelerometer 236 does not detect movement, the NFC payment object reader sits at the detection step 602.

Once the accelerometer 236 detects movement (an acceleration), the NFC payment object reader wakes up its subsystems at 604. For example in FIG. 2, accelerometer 236 detects movement and provides an input to the wake up electronics 230 to instruct NFC microcontroller 210 to wake up driving circuit 212.

Since tuning of a NFC antenna while it is in motion can complicate the tuning process due to changing environmental surroundings, step 606 can detect whether the NFC payment object reader is moving. If the NFC payment object reader is in motion, the method can pause until movement is completed. However, in some embodiments, the tuning process can still proceed with the accelerometer data being an input into the tuning algorithm. Such input can be used to trigger a faster resynchronization rate or shorter timeout of the tuning circuit 208. In any event, the tuning algorithm can be configured to expect potential abnormalities created by the difficulties of tuning a NFC antenna while it is in motion.

Once the NFC payment object reader has stopped moving, a tuning process can be initiated. At step 608, NFC antenna system can determine whether the NFC antenna is detuned. The NFC microcontroller 210 and the NFC Antenna Monitor 217 can detect whether NFC antenna 218 is detuned. In some embodiments, NFC microcontroller 210 can directly detect whether NFC antenna 218 is detuned. If it is detected that the NFC antenna 218 is operating as its default resonant frequency, the antenna is in tune, and the method can 612. However, if the antenna 218 is detuned method 600 proceeds to step 610.

In some embodiments, NFC antenna 218 is configured to detect whether it is detuned. In such an example, the NFC antenna 218 is excited to its default resonant frequency range and NFC Antenna Monitor 217 monitors any change in frequency of NFC antenna 218. The presence of a NFC enabled object into the antenna 210's field can cause the antenna's frequency to drift away from resonance or detune. The NFC Antenna Monitor 217 can detect a decrease in frequency or detuning of NFC antenna 218 and can trigger the NFC microcontroller 210 to instruct driving circuit 212 to tune detuned NFC antenna 218.

In some embodiments an anti-tamper module 220 can be used to determine or predict that the NFC antenna 218 might be detuned. For example, the anti-tamper module 220 can be a tamper mesh. A tamper mesh can be integrated with a system and prevent the system from being physically accessed. In some instances, tamper mesh can function like an inductor, and produce its own resonant frequency, similar to that of the NFC antenna's default resonant frequency. Therefore, the presence of a NFC enabled object within the tamper mesh's electromagnetic field, can change the frequency detected by a sensor connected to the tamper mesh and can indicate whether the NFC antenna would likely be detuned. The sensor connected to the tamper mesh can trigger the NFC antenna system to tune the NFC antenna.

At step 610 the NFC antenna is tuned. For example in FIG. 2, driving circuit 212 can tune detuned NFC antenna 218 by varying the capacitance of an analog variable capacitor. In another example, NFC Antenna Monitor 217 detects a detuned NFC antenna and triggers NFC microcontroller 210 to trigger FET switches to switch in one or more members of a bank of capacitors to add capacitance to the overall antenna system. In another example, controller 202 can cause an increase in voltage to be supplied to antenna 210.

As mentioned above, in some embodiments, the event detected, can be proximity of a NFC enabled object near the NFC antenna. In some embodiments, the NFC enabled object can be a NFC enabled card. In some embodiments, the NFC enabled object can be a smart phone. In some embodiments, the object can be a NFC enabled wearable (e.g. a watch, a bracelet, etc.).

Figure 7:
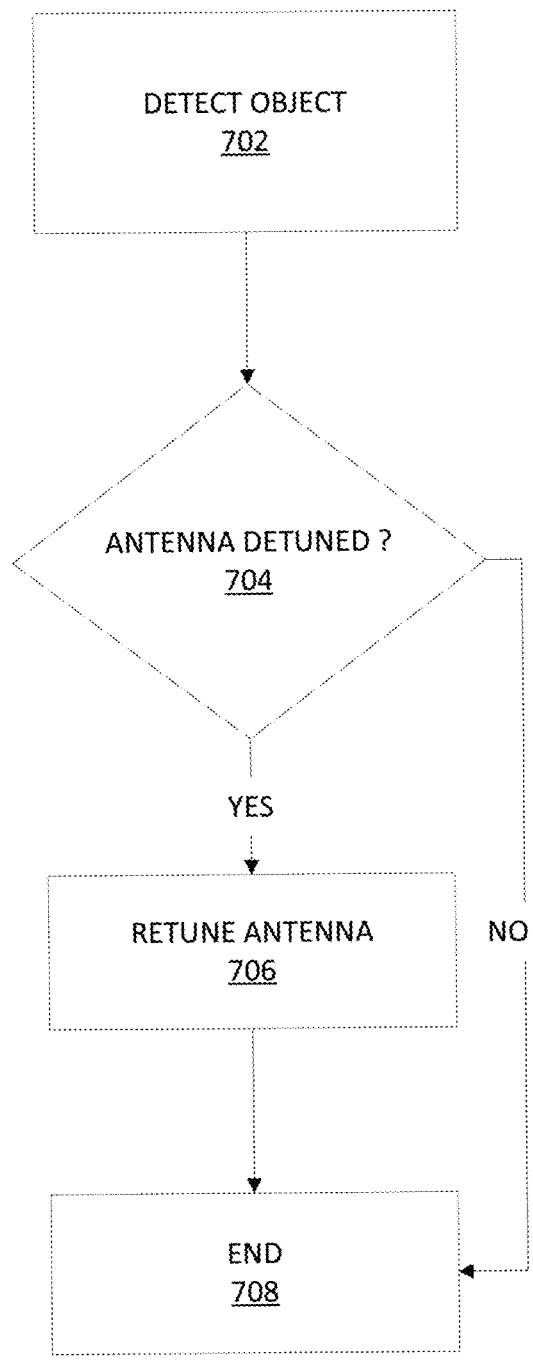
FIG. 7 illustrates an example method for tuning a NFC payment object reader based on input from a proximity sensor.

FIG. 7 illustrates an example method for tuning the NFC payment object reader based on input from a proximity detector. At step 702 a NFC payment object reader detects a NFC enabled object. For example, in FIG. 2, proximity detector 234 can detect the presence of a NFC enabled object. In some embodiments the proximity detector 234 can detect or determine the distance of the NFC enabled object to the NFC antenna.

The proximity detector 234 can be an infrared sensor, a microwave sensor, an ultrasonic sensor, or a radio-wave sensor, for example. The proximity detector 234 can also be cameras and a processor to optically process and detect the distance of a NFC enabled object relative to the NFC antenna using the images captured by the cameras.

In step 704, NFC payment object reader determines whether the NFC antenna is potentially detuned. Generally there is known distance between the object and the NFC antenna system, where detuning of the NFC antenna begins. Therefore when proximity detector 234 detects an object has passed through a predetermined distance threshold it can trigger the NFC microcontroller 210 to instruct driving circuit 212 to tune 706 NFC antenna 218. In some embodiments, configuration of NFC Antenna Monitor 217 can instruct NFC microcontroller 210 to instruct driving circuit 212 to change its tuning circuit's capacitance, voltage, or inductance according to the detected distance of the NFC enabled object to the NFC antenna 218 by proximity detector 234.

In some embodiments, the NFC payment reader can include both a proximity detector and an accelerometer and gain the combined benefits of these two inputs into a NFC tuning algorithm. As described herein a proximity detector can be useful in determining that a payment object is too close to the NFC antenna and thus the antenna's properties need to be adjusted to be able to effectively read the payment object. The motion detector can be useful as an input into the tuning algorithm to take into account potential behaviors of the NFC antenna that are consistent with a changing environment within which the NFC antenna is operating.

Both sensors can also be used to wake the device from a low power state. In some embodiments, the entire device can be powered up upon detection of movement or card proximity by the accelerometer or proximity sensor, respectively, or selected subsystems can be powered.

Figure 8:
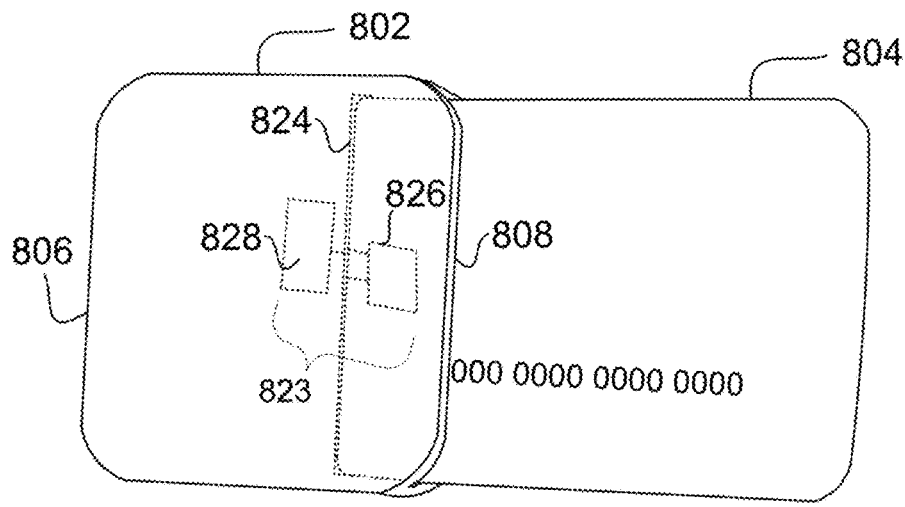
FIG. 8 is an example perspective view of a wireless payment object reader with a chip card being inserted.
Figure 9:
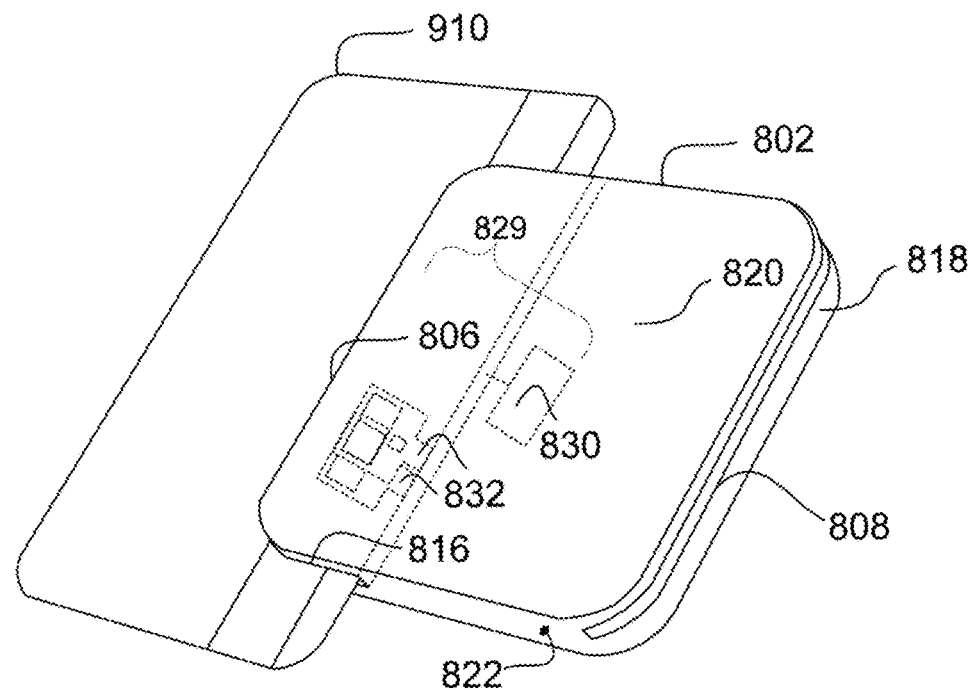
FIG. 9 is an example perspective view of a wireless payment object reader with a magnetic stripe card being swiped.

Reference is now made to FIGS. 8 and 9. FIG. 8 is an example perspective view 800 of a wireless payment device 802 with a smart chip card 804 being inserted at a slot 808 of a chip payment object reader interface 823. FIG. 9 is an example perspective view 912 of a wireless payment object reader 802 with a magnetic stripe card 910 being swiped at a groove 806 of a magnetic stripe reader interface 829 that is opposite to the chip payment object reader interface 823. In some embodiments, the wireless payment device 800 may omit groove 806 and associated magnetic stripe reader interface 829, and provide a single slot 808 for receiving IC payment objects.

The wireless payment device 802 can have a frame that is configured to receive card insertions or card swipes. The frame can include a top surface 820, side surfaces 818, and a bottom surface 822. In the implementations shown in FIGS. 8 and 9, the wireless payment device 802 has a frame that is shaped as a thin parallelepiped, e.g., the width of the frame (along the top surface 820) is at least five or ten times the height (along the side surfaces 818). The top surface and bottom surface can be generally shaped as a square or rectangle, e.g., a square or rectangle with rounded edges.

The side surfaces 818 can include one or more openings that receive cards through, respectively, one or more card interfaces. The one or more card interfaces include circuitry, e.g., chip payment object reader circuitry 828 or magnetic stripe reader circuitry 830, configured to read data stored on the card. In some implementations, the wireless payment object reader has two openings on opposite sides of the frame, and a card interface within each opening. In some implementations, the wireless payment device has a single opening with one of the IC interface, or an MSR interface, or both in a same opening.

The wireless payment object reader 802 can include circuitry configured to direct signals from the one or more card interfaces, to communicate wirelessly with a computing device, and to efficiently power the wireless payment object reader 802. The one or more card interfaces of the wireless payment object reader 802 can include both a chip payment object reader interface 823 and a magnetic stripe reader interface 829. In some implementations, the interfaces are on opposite sides of the wireless payment object reader 802 as shown in FIGS. 8-9. In particular, the payment object reader 802 can include both a groove 806 on one side surface of the frame and a slot 808 on an opposite side surface of the frame. The groove 806 can extend across the entire width of the frame, and can be configured to receive a swipe of a magnetic stripe card. The magnetic stripe reader interface 829, including magnetic read heads 832 positioned to read the magnetic information on the stripe of the card as it is being swiped, are positioned in the groove 806. The slot 808 can extend across part, but not all of the width of the frame, leaving one or more thin side walls 824 to constrain the lateral position of a chip card as it is inserted into the slot 808. The chip payment object reader interface 823, including electrical contacts 826 positioned to electrically engage the contacts on the chip card when it is inserted, are positioned in the slot 808.

In alternative implementations, the interfaces are on the same side of the wireless payment object reader 802 and share an opening for receiving smart chip cards and magnetic stripe cards. In some implementations, a spring-loaded gate is included within the slot 808 of a chip payment object reader interface 823. The spring-loaded gate can be configured to engage the electrical contacts 826 with the contacts of a chip card when a chip card is inserted. On the other hand, the spring-loaded gate keeps the electrical contacts 826 recessed so a card being swiped does not engage with the electrical contacts 826.

In some implementations, the chip payment object reader interface 823 is configured to receive an external adapter through the electrical contacts 826. The external adapter can provide power to recharge the wireless payment object reader 802, e.g., by engaging the electrical contacts 826. The external adapter can connect the chip payment object reader interface 823 to a USB port or power supply. The external adapter can also provide software updates to the wireless payment object reader 802.

Figure 10:
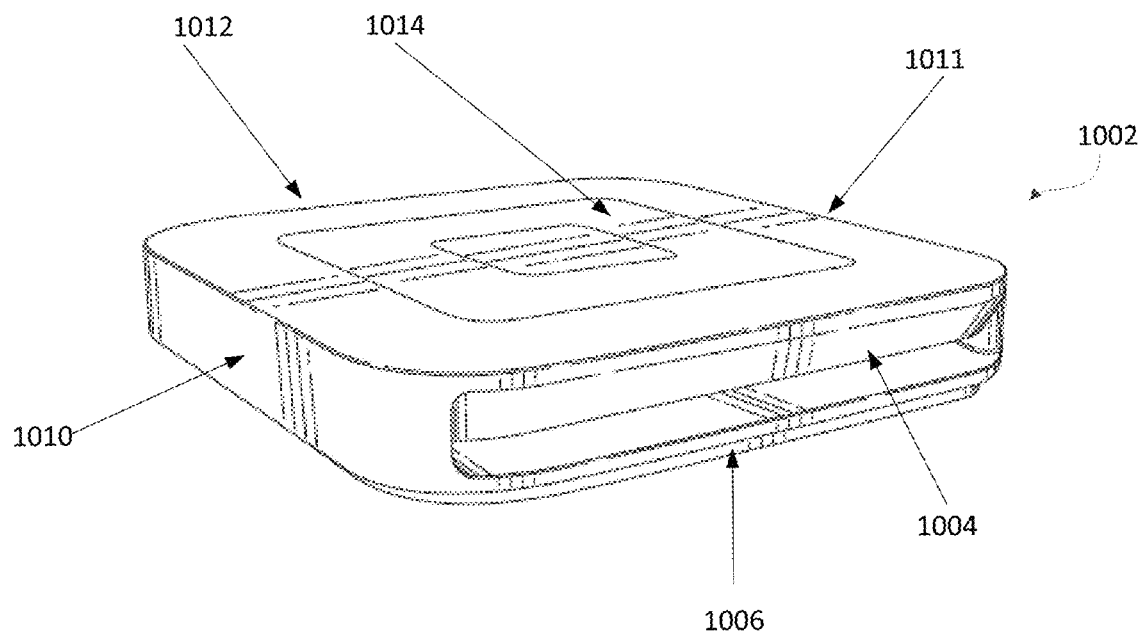
FIG. 10 is an example perspective view of a wireless payment object reader with a single slot.

FIG. 10 illustrates an example perspective view of a wireless payment device 1002 with single slot 1004 for receiving IC payment objects. In some embodiments, more than one slot can be provided. The device 1002 can include a first surface 1006, a side surface 1010, an opposing side surface 1011 and a second surface 1012. The payment device 1002 can also include a front face 1014 and an opposing back face (not shown in FIG. 10). In the implementation shown in FIG. 10, the wireless payment device 1002 has a frame that is shaped as a thin parallelepiped, e.g., the width of the frame (along the first surface 1006) is at least five or ten times the height (along the side surface 1010) in some embodiments. The front face 1014 and bottom face can be generally shaped as a square or rectangle, e.g., a square or rectangle with rounded edges.

The first surface 1006 can include one or more openings that receive cards through, respectively, one or more card interfaces. In the implementation shown in FIG. 10, the wireless payment device 1002 has a single slot 1004. The single slot 1004 includes a card interface. The card interface can include integrated circuit (IC) chip payment object reader circuitry. For example the card interface can include a chip payment object reader circuitry for receiving IC payment objects. The wireless payment device can also have components as shown in FIG. 2. As shown in FIG. 2, the chip payment card reader, similar to chip card reader interface 204, can be coupled to a microcontroller, similar to microcontroller 202.

Furthermore wireless payment device 1002 may also include NFC related components also shown in FIG. 2. For example, similar to FIG. 2, wireless payment device 1002 may also include NFC microcontroller 210. NFC microcontroller 210 is configured to manage the transmission and reception of near field communications through control of driving circuit 212, NFC modulator 214, NFC RX module 216, NFC antenna monitoring circuit 217, and NFC antenna 218. In some embodiments, the antenna 217 is disposed internally in the payment device 1002 near the front face 1014 to facilitate reading NFC enabled payment objects proximate the front face 1014.

The wireless payment object reader 1002 can include circuitry configured to direct signals from the one or more card interfaces, to communicate wirelessly with a computing device, and to efficiently power the wireless payment object reader 1002. The slot 1004 can extend across part, but not all of the width of the frame, leaving one or more thin sidewalls to constrain the lateral position of a chip card as it is inserted into the slot 1004 and to prevent rotation of the card while in the slot. The chip payment object reader interface, including electrical contacts positioned to electrically engage the contacts on the chip card when it is inserted, are positioned in the slot 1004.

In some implementations, the chip payment object reader interface in slot 1004 is configured to receive an external adapter through electrical contacts in wireless payment object reader 1002. The external adapter can provide power to recharge the wireless payment object reader 1002, e.g., by engaging the electrical contacts within slot 1004 of wireless payment object reader. The external adapter can connect the chip payment object reader interface to a USB port or power supply. The external adapter can also provide software updates to the wireless payment object reader 1002.

Figure 11:
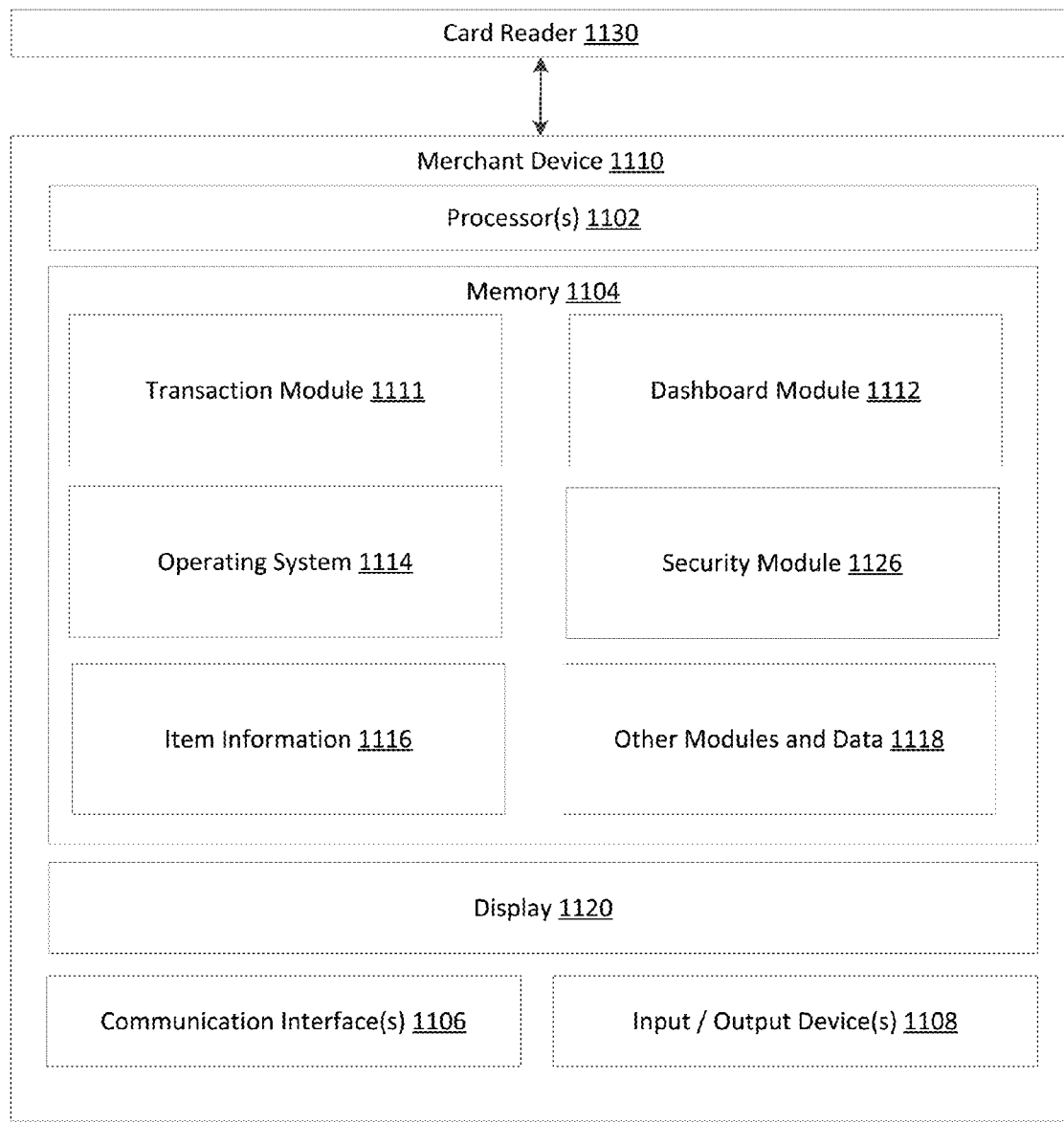
FIG. 11 illustrates an example block diagram of components of a merchant POS device.

FIG. 11 is a block diagram illustrating select components of an example merchant POS system according to some embodiments. A merchant device 1100 can be the merchant device 116 shown in FIG. 1, for example. The merchant device 1100 can be any suitable type of computing device, e.g., portable, semi-portable, semi-stationary, or stationary device.

In the example illustrated in FIG. 11, the merchant device 1100 includes at least one processor 1102, a memory 1104, one or more communication interfaces 1106, and one or more input/output (I/O) devices 1108. Each processor 1102 can itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some embodiments, the processor 1102 can be one or more hardware processors and/or logic circuits of any suitable type specifically programmed or configured to execute the algorithms and processes described herein by performing various input/output, logical, and/or mathematical operations. The processor 1102 can be configured to fetch and execute computer-readable processor-executable instructions stored in the memory 1104.

Other components included in the merchant device 1100 can include various types of sensors (not shown), which can include a GPS device, an accelerometer, gyroscope, compass, proximity detector, and the like. Additionally, the merchant device 1100 can include various other components that are not shown, examples of which include removable storage, a power source, such as a battery and power control unit, and so forth.

Depending on the configuration of the merchant device 1100, the memory 1104 can be an example of non-transitory computer storage media (e.g., computer-readable media) and can include volatile and nonvolatile memory and/or removable and non-removable media implemented in any type of technology for storage of information such as computer-readable processor-executable instructions, data structures, program modules or other data. The computer-readable media can include, but is not limited to, RAM, ROM, EEPROM, flash memory, solid-state storage, magnetic disk storage, optical storage, and/or other computer-readabke media technology. Further, in some cases, the merchant device 1100 can access external storage, such as RAID storage systems, storage arrays, network attached storage, storage area networks, cloud storage, or any other medium that can be used to store information and that can be accessed by the processor 1102 directly or through another computing device or network. Accordingly, the memory 1104 can be computer storage media able to store instructions, modules or components that can be executed by the processor 1102.

The memory 1104 can be used to store and maintain any number of functional components or modules that are executable by the processor 1102. In some embodiments, these functional components comprise instructions or programs that are executable by the processor 1102 and that, when executed, implement operational logic for performing the actions and services attributed above to the merchant device 1100. Functional components of the merchant device 1100 stored in the memory 1104 can include a transaction module 1110, a dashboard module 1112, and a security module 1126, although it can also contain modules or portions of modules assigned herein to the payment processing system 102. The transaction module 1110, dashboard module 1112 and security module 1126 can all be a part of a merchant application, for example merchant application 118, running on merchant device 116. The transaction module 1110, for example, presents an interface, such as a payment interface to enable the merchant to conduct transactions, receive payments, and so forth, as well as for communicating with the payment processing system 102 for processing payments and sending transaction information. The dashboard module 1112 enables the merchant to manage the merchant's account, the merchant profile, merchant preferences, view saved or new pricing information, communicate with the payment processing system 102 regarding cash advances, offers of incentives, invitations, and the like. The security module 1126 can, as described herein, enable the merchant application to encrypt and decrypt transaction information communicated between the merchant device 1100 and other system components. Additional functional components can include an operating system 1114 for controlling and managing various functions of the merchant device 1100 and for enabling basic user interactions with the merchant device 1100.

In addition, the memory 1104 can also store data, data structures and the like, that are used by the functional components. For example, data stored by the memory 1104 can include item information 1116 that includes information about the items offered by the merchant, which can include a list of items currently available from the merchant, images of the items, descriptions of the items, prices of the items, and so forth. For instance, when the merchant 122 is setting up the merchant application 118 to accept payments for particular items offered by the merchant 122, the merchant can enter the item information 1116 for the particular items. Depending on the type of the merchant device 1100, the memory 1104 can also optionally include other functional components and data, such as other modules and data 1116, which can include programs, drivers, etc., and the data used or generated by the functional components. Further, the merchant device 1100 can include many other logical, programmatic and physical components, of which those described are merely examples that are related to the discussion herein.

The communication interface(s) 1106 can include one or more interfaces and hardware components for enabling communication with various other devices, such as over the network(s) 114 or directly. For example, communication interface(s) 1106 can enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 1106 can include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 1106 also provides other conventional connections to the network 114 for distribution of files and/or media objects using standard network protocols such as TCP/IP, HTTP, HTTPS and SMTP as will be understood.

The merchant device 1100 can further include a display 1120, which can employ any suitable display technology. For example, the display 1120 can be a liquid crystal display, a plasma display, a light emitting diode display, an OLED (organic light-emitting diode) display, an electronic paper display, or any other suitable type of display able to present digital content thereon. In some embodiments, the display 1120 can have a touch sensor associated with the display 1120 to provide a touchscreen display configured to receive touch inputs for enabling interaction with a graphical user interface presented on the display 1120. Accordingly, embodiments described herein are not limited to any particular display technology. Alternatively, in some embodiments, the merchant device 1100 might not include the display 1120, and information can be presented by other means, such as aurally.

The merchant device 1100 can further include one or more I/O devices 1108. The I/O devices 1108 can include speakers, a microphone, a camera, and various user controls (e.g., buttons, a joystick, a keyboard, a keypad, etc.), a haptic output device, and so forth.

In addition, the merchant device 1100 can include or can be connectable to a payment object reader 1130. In some embodiments, the payment object reader 1130 can plug in to a port in the merchant device, such as a microphone/headphone port, a data port, or other suitable port, or can communicate via wireless connection to the merchant device. The payment object reader 1130 can include a card interface 1106 for reading a magnetic stripe or an integrated circuit of a payment card 130, 132, and further can include encryption technology for encrypting the information read from the payment card 130, 132. Alternatively, numerous other types of payment object readers 1130 can be employed with the merchant devices 1110 herein, depending on the type and configuration of the merchant device 1100.

Figure 12:
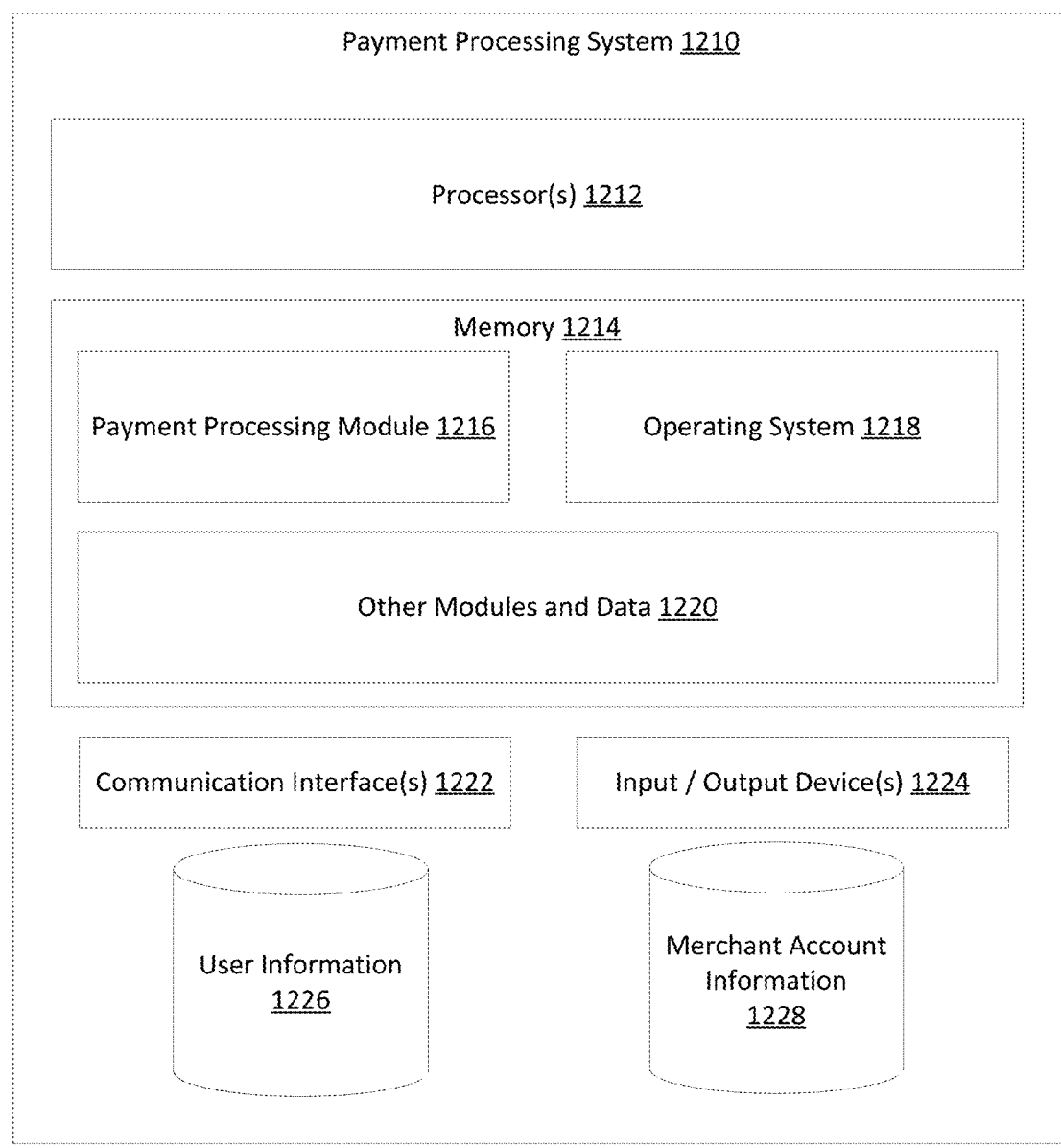
FIG. 12 illustrates an example block diagram of components of a payment processing system.

FIG. 12 is a block diagram illustrating select components of an example payment processing system 1210 according to some embodiments. The payment processing system 1210 can comprise the payment processing system 112 in an example embodiment. The payment processing system 1210 can be any suitable type of computing device capable of sending communications and performing the functions according to the techniques described herein and can provide the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the examples herein illustrate the components and data of the payment processing system 1210 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 1210. Multiple payment processing systems 1210 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 12, the payment processing system 1210 includes one or more processors 1212, one or more memory devices 1214, one or more communication interfaces 1222, and one or more input/output devices 1224. These components can be similar to those described above with reference to FIG. 1 and elsewhere herein.

The memory 1214 can be used to store and maintain any number of functional components or modules that are executable by the processor 1212. In some embodiments, these functional components comprise instructions or programs that are executable by the processor 1212 and that, when executed, implement operational logic for performing the actions and services attributed above to the payment processing system 1210. Functional components of the payment processing system 1210 stored in the memory 1214 can include the payment processing module 1216, the operating system 1218, and other modules and data 1220. These components can be similar to those described with reference to FIG. 1 and elsewhere herein. In addition, the memory 1214 can store data used for performing the operations described herein. Thus, the memory 1214 can store merchant information 1226, including the merchant profiles. Further, the payment processing system 1210 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A payment object reader comprising:
a near field communication (NFC) antenna configured for reading an NFC enabled object, wherein the NFC antenna is subject to detuning away from a predetermined resonant frequency of the NFC antenna when a metal or conductive portion of the NFC enabled object is within a detuning distance from the NFC antenna;
a proximity sensor configured to detect that the NFC enabled object is within the detuning distance relative to the NFC antenna;
a NFC tuning subsystem configured to control tuning of the NFC antenna when the proximity sensor detects that the NFC enabled payment object is within the detuning distance relative to the NFC antenna, wherein the tuning of the NFC antenna is controlled to allow reading the NFC enabled payment object when the NFC enabled payment object is within the detuning distance; and
an accelerometer connected to the NFC tuning subsystem configured to output a device movement state.

2. The payment object reader of claim 1, wherein the NFC tuning subsystem includes a variable capacitor that is controlled to keep a resonant frequency of the NFC antenna near a predetermined resonant frequency.

3. The payment object reader of claim 1, wherein when the device movement state indicates that the payment object reader is moving, the NFC tuning subsystem is configured to delay tuning of the NFC antenna.

4. The payment object reader of claim 1, wherein the NFC tuning subsystem includes a first capacitor with a first capacitance connected to a first switch, and a second capacitor with a second capacitance connected to a second switch.

5. A payment object reader comprising:
a near field communication (NFC) antenna configured for reading a NFC enabled object,
a proximity sensor configured to detect that the NFC enabled object is within a detuning distance relative to the NFC antenna;
a NFC tuning subsystem configured to control tuning of the NFC antenna when the proximity sensor detects that the NFC enabled payment object is within the detuning distance relative to the NFC antenna; and
an accelerometer connected to the NFC tuning subsystem configured to output a device movement state.

6. The payment object reader of claim 5, wherein the NFC tuning subsystem includes a variable capacitor that is controlled to keep a resonant frequency of the NFC antenna near a predetermined resonant frequency.

7. The payment object reader of claim 5, wherein the NFC tuning subsystem includes a first capacitor with a first capacitance connected to a first switch, and a second capacitor with a second capacitance connected to a second switch.

8. The payment object reader of claim 7, wherein the first switch is configured to be closed and to connect first capacitor to the antenna when a payment card is within a first detuning distance from the payment object reader.

9. The payment object reader of claim 8, wherein the second switch is configured to be closed and to connect second capacitor to the antenna when a payment card is within a second detuning distance from the payment object reader, the second detuning distance being less than the first detuning distance.

10. The payment object reader of claim 5, wherein the NFC tuning subsystem is configured to increase a voltage applied to the NFC antenna.

11. The payment object reader of claim 5, wherein the proximity sensor includes a tamper mesh connected to an inductance measuring circuit, and wherein the inductance measuring circuit is configured to detect a change in inductance caused by the proximity of a metal object to the tamper mesh.

12. The payment object reader of claim 5, wherein the proximity sensor includes an infrared transmitter and photo detector.

13. The payment object reader of claim 5, wherein the proximity sensor includes a camera and processor configured to process a digital image.

14. The payment object reader of claim 5, wherein the proximity sensor includes an inductance measuring circuit and the inductance measuring circuit is configured to detect a change in inductance caused by the proximity of an object.

15. The payment object reader of claim 5, wherein when the device movement state indicates that the payment object reader is moving, the NFC tuning subsystem is configured to delay tuning of the NFC antenna.

16. The NFC payment object reader of claim 15, wherein the NFC tuning subsystem is further configured to tune the NFC antenna when a tamper mesh operatively coupled to an inductance measuring circuit detects a change in inductance caused by the proximity of a metal object to the tamper mesh.

17. A method comprising:
detecting, using a proximity sensor of a payment object reader, that a NFC enabled object is within a detuning distance relative to a NFC antenna of the payment object reader;
detecting movement by an accelerometer of the payment object reader, the payment object reader having the NFC antenna configured for reading the NFC enabled object;
outputting, by the accelerometer, a device movement state to a NFC tuning subsystem; and
controlling tuning of the NFC antenna, by the NFC tuning subsystem, based on the device movement state.

18. The method of claim 17, wherein controlling the tuning includes controlling a variable capacitor that is to keep a resonant frequency of the NFC antenna near a predetermined resonant frequency.

19. The method of claim 17, wherein controlling the tuning includes increasing a voltage applied to the NFC antenna.

20. The method of claim 17, wherein the proximity sensor detector is a tamper mesh connected an inductance measuring circuit, wherein the inductance measuring circuit is configured to detect a change in inductance caused by the proximity of a metal object to the tamper mesh.

* * * * *